H. G. POWELL.
Improvement in Insertable Saw-Teeth.
No. 130,659. Patented Aug 20, 1872.
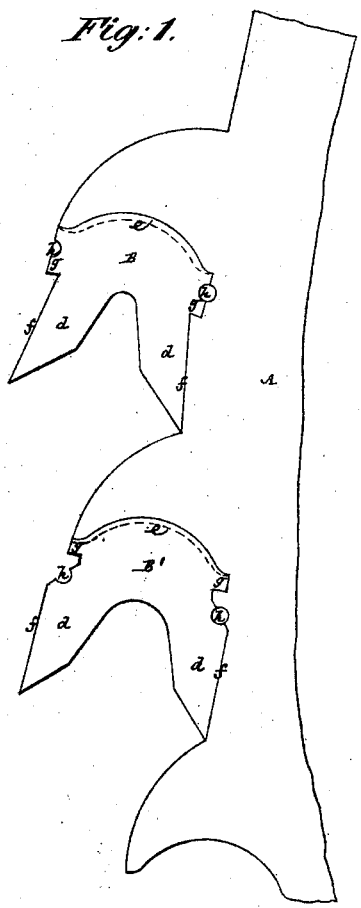
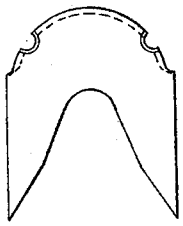

UNITED STATES PATENT OFFICE.

HENRY G. POWELL, OF TRENTON, NEW JERSEY.

IMPROVEMENT IN INSERTIBLE SAW-TEETH.

Specification forming part of Letters Patent No. 130,659, dated August 20, 1872.

Specification describing an Improvement in Insertible Saw-Teeth, the invention of HENRY G. POWELL, of Trenton, in the county of Mercer and State of New Jersey.

This improvement in insertible saw-teeth, which is applicable to circular and other saws, consists in a compound or twin-tooth, constructed to form independent teeth or cutting portions, either of which may be brought into action by reversing the whole or combined tooth. The improvement also consists in a special construction of such, whereby it may be fitted and securely held to the saw-blade without entering deeply into or materially weakening the latter.

In the accompanying drawing, which forms part of this specification, Figure 1 represents a side view of a section or portion of a saw-blade or body, in part, with my improved teeth, under two slightly different modifications, applied thereto. Fig. 2 is a view of one of the teeth detached.

A represents the portion or section of a saw-blade or body, and B B' two compound or twin and reversible teeth fitted thereto. Each of these teeth is similar so far as being formed with two like cutting portions, $d\,d$, united by a back or end portion, $e$, which latter may be grooved on its edge to fit a beveling construction of the recess in the saw-blade into which the tooth is fitted; but no novelty is here claimed for such grooved and bevel fit of the teeth and blade. The outer lines or edges $ff$ of the cutting portions $d\,d$ fit against similar-shaped continuations of the recesses in the blade, but as both cutting portions of each tooth point in the direction of the rim of the saw when cutting, there is no necessity for the teeth to enter deeply into or materially weaken the blade; yet a firm hold of the teeth may be obtained by means of locking lips or projections $g\,g$ and rivet-holes $h\,h$, or either, on both sides of each twin-tooth, the saw-blade being shaped to correspond.

I do not restrict myself, however, to any particular mode of uniting or locking the teeth with the blade, nor yet to any particular shape or set of the cutting portions $d\,d$, so long as both cutting portions of each tooth are alike to admit of the tooth being reversed—that is, either cutting portion, $d$, being placed outward.

A twin or compound and reversible saw-tooth, constructed as described, is not merely detachable to provide against wear or breakage, but combines two teeth in one, capable of alternate or successive use, as occasion requires; thus materially adding to the economy and durability of the saw and doing away with many inconveniences; nor is the blade weakened or materially injured by any deep entry of the detachable tooth within it, and much metal is saved over or as compared with the general construction of saws having detachable teeth.

What is here claimed and desired to be secured by Letters Patent is—

An insertible saw-tooth, composed of two similarly-constructed cutting portions, $d\,d$, united by a back or end portion, $e$, and with locking lips or projections and rivet-holes, or either, on both sides of it, for attachment of the tooth to the saw-blade and to permit of its reversal, essentially as described.

HENRY G. POWELL.

Witnesses:
FRED. HAYNES,
FERD. TUSCH.